(12) United States Patent
Kawashima (10) Patent No.: US 8,286,741 B2
(45) Date of Patent: Oct. 16, 2012

(54) HYBRID OPERATING MACHINE

(75) Inventor: Koji Kawashima, Yokosuka (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 226 days.

(21) Appl. No.: 12/825,915

(22) Filed: Jun. 29, 2010

(65) Prior Publication Data

US 2011/0000722 A1 Jan. 6, 2011

(30) Foreign Application Priority Data

Jul. 1, 2009 (JP) ................... 2009-156516

(51) Int. Cl.
*B60W 10/04* (2006.01)
(52) U.S. Cl. .................. 180/65.285; 701/54; 180/65.28
(58) Field of Classification Search .............. 180/69.5, 180/69.3, 65.265, 65.275, 65.285, 54.1; 701/36, 701/54, 55
See application file for complete search history.

(56) References Cited

U.S. PATENT DOCUMENTS

| | | | | |
|---|---|---|---|---|
| 6,009,365 A | * | 12/1999 | Takahara et al. | 701/54 |
| 8,062,081 B2 | * | 11/2011 | Barrett et al. | 440/1 |
| 8,083,016 B2 | * | 12/2011 | Naik et al. | 180/65.23 |
| 2011/0000722 A1 | * | 1/2011 | Kawashima | 180/65.28 |

FOREIGN PATENT DOCUMENTS

| | | |
|---|---|---|
| JP | 2005-210870 | 8/2005 |
| JP | 2009-074406 A | 4/2009 |
| JP | 2009074406 A * | 4/2009 |

OTHER PUBLICATIONS

Japanese Office Action application No. 2009-156516 dated May 17, 2011.

* cited by examiner

*Primary Examiner* — John Walters
*Assistant Examiner* — James Triggs
(74) *Attorney, Agent, or Firm* — Squire Sanders (US) LLP

(57) ABSTRACT

A motor generator selectively performs a power generation operation and an assisting operation. A torque transmission machine performs mutual transfer among a torque of an engine, a torque of the motor generator, and a torque to be applied to an external load of the engine. A speed sensor measures the rotating speed of the engine. A control device controls the engine and the motor generator. The control device stores a speed command value for the engine, calculates the torque generated by the motor generator based on the power required for the external load, to perform the torque control of the motor generator, and performs the speed control of the motor generator based on the difference between the rotating speed measured by the speed sensor and the speed command value. The torque control and the speed control of the motor generator can be switched.

4 Claims, 11 Drawing Sheets

HYBRID OPERATING MACHINE

BACKGROUND OF THE INVENTION

1. Field of the Invention

The present application claims priority on Japanese Patent Application No. 2009-156516, filed on Jul. 1, 2009, the contents of which are incorporated herein by reference.

The present invention relates to a hybrid operating machine, an engine of which is assisted with a motor generator.

2. Description of Related Art

In recent years, for power generation machines for construction machines and the like, performances, such as energy efficiency, low pollution, and low noise, which take the Earth's environment into consideration, have been in demand. In order to satisfy these requirements, operating machines, such as a hydraulic excavator, which utilize an electric motor instead of a hydraulic pump or as assistance of engines, such as an internal-combustion engine, have appeared. In an operating machine incorporating the electric motor, the surplus kinetic energy generated from the electric motor is converted into electrical energy, and is stored in a capacitor, etc.

When engine load increases, and number of revolutions decreases, the engine speed can be brought close to a target engine speed by operating a motor generator as the electric motor according to the deviation of a real engine speed from the target engine speed, thereby performing torque assistance (Japanese Unexamined Patent Application Publication No. 2005-210870).

SUMMARY OF THE INVENTION

If the engine is brought into a high load state or an overload state when speed control of the engine is performed, it becomes difficult to perform a suitable speed control because a torque limit control is performed. When the speed control is also applied to the motor generator, whenever the engine speed of the engine decreases, assist operation of the motor generator will be performed even if the output of the engine is excessive. In order to recover the electric power consumed when the assist operation of the motor generator was performed to a battery (capacitor) from the engine, a loss resulting from the efficiency of the motor generator occurs.

According to one aspect of the invention, there is provided a hybrid operating machine including an engine which generates torque by combustion of a fuel, a motor generator capable of selectively performing a power generation operation and an assisting operation, an external load serving as an engine load, a torque transmission machine which performs mutual transfer among the torque of the engine, a torque of the motor generator, and a torque to be applied to the external load, a speed sensor which measures the rotating speed of the engine, and a control device which controls the engine and the motor generator.

The control device is capable of storing a speed command value which indicates a target value of the speed control of the engine, calculating the torque generated by the motor generator on the basis of the power required for the external load to perform the torque control of the motor generator, performing the speed control of the motor generator on the basis of the difference between the rotating speed measured by the speed sensor, and the speed command value, and switching a control mode where the torque control of the motor generator is performed, and a control mode where the speed control is performed.

It is possible to switch a torque control and a speed control, thereby performing a more suitable control in response to an operation situation.

DETAILED DESCRIPTION OF THE INVENTION

Figure 1:
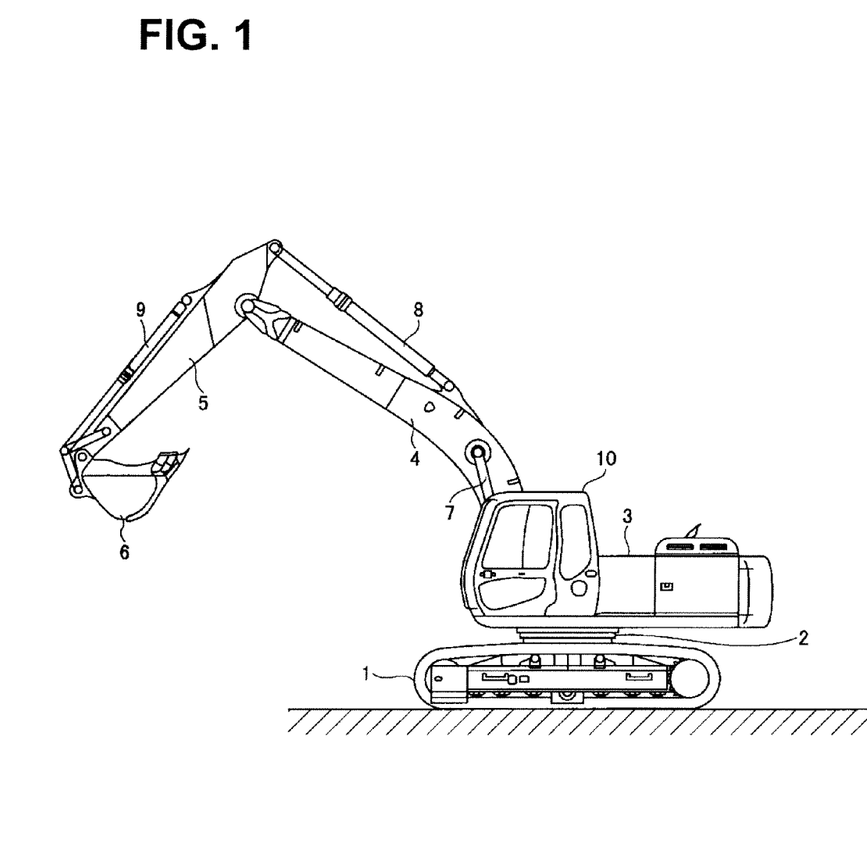
FIG. 1 is a side view of a hybrid operating machine according to an example.

A side view of a hybrid operating machine according to an example is shown in FIG. 1. An upper turning body 3 is mounted on a lower traveling body (base body) 1 via a turning mechanism 2. The turning mechanism 2 includes an electric motor (motor), and turns the upper turning body 3 in a clockwise direction or a counterclockwise direction. A boom 4 is attached to the upper turning body 3. The boom 4 swings up and down with respect to the upper turning body 3 by a boom cylinder 7 which is hydraulically driven. An arm 5 is attached to the tip of the boom 4. The arm 5 swings back and forth with respect to the boom 4 by an arm cylinder 8 which is hydraulically driven. A bucket 6 is attached to the tip of the arm 5. The bucket 6 swings up and down with respect to the arm 5 by a bucket cylinder 9 which is hydraulically driven. A cabin 10 which accommodates a driver is mounted on the upper turning body 3.

Figure 2:
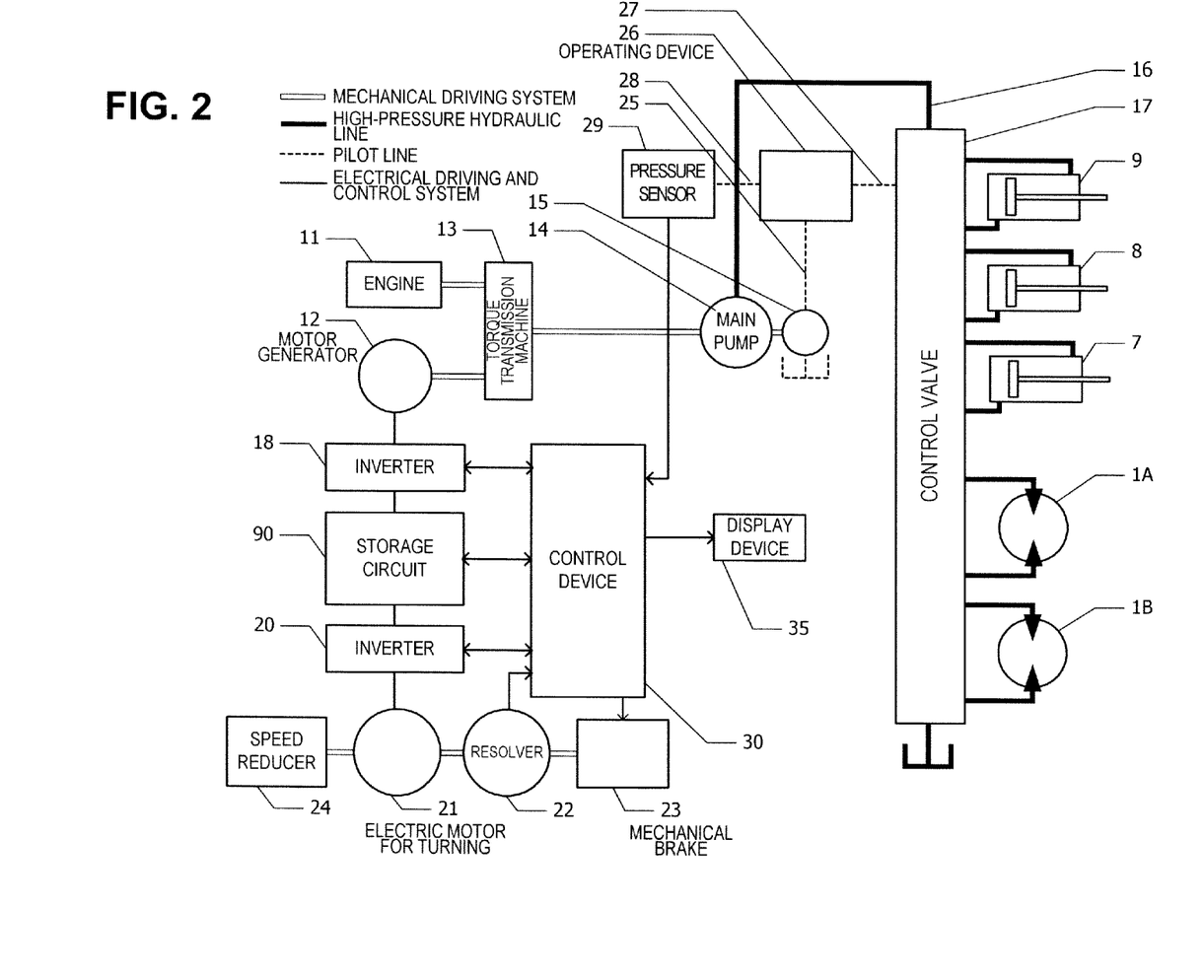
FIG. 2 is a block diagram of the hybrid operating machine according to the example.

A block diagram of the hybrid operating machine is shown in FIG. 2. In FIG. 2, a mechanical power system is expressed by a double line, a high-pressure-hydraulic line is expressed by a thick solid line, an electrical system is expressed by a thin solid line, and a pilot line is expressed by a broken line.

A driving shaft of an engine 11 is connected to one rotary shaft of a torque transmission machine 13. An engine which generates a driving force by combustion of a fuel, for example, an internal combustion engine, such as a diesel engine, is used as the engine 11. The engine 11 is always driven during the operation of the operating machine.

A driving shaft of a motor generator 12 is connected to another rotary shaft of the torque transmission machine 13. The motor generator 12 can perform both operations including a power (assisting) operation and a regenerating (power generating) operation. For example, an interior permanent magnet embedded (IPM) motor in which a magnet is embedded in a rotor is used as the motor generator 12.

A driving shaft of a main pump 14 is connected to still another rotary shaft of the torque transmission machine 13. The main pump 14 serves as an external load of the engine 11.

If the load applied to the engine 11 is large, an assisting operation of the motor generator 12 is performed, and the driving force of the motor generator 12 is transmitted to the main pump 14 via the torque transmission machine 13. This alleviates the load applied to the engine 11. On the other hand, if the load applied to the engine 11 is small, the driving force of the engine 11 is transmitted to the motor generator 12 via the torque transmission machine 13, and thereby, the power-generating operation of the motor generator 12 is performed. Switching between the assisting operation and power-generating operation of the motor generator 12 is performed by an inverter 18 connected to the motor generator 12. The inverter 18 is controlled by a control device 30.

The control device 30 displays the degradation state or the like of various devices on the display device 35, thereby bringing them to the driver's attention.

The main pump 14 supplies oil pressure to a control valve 17 via the high-pressure-hydraulic line 16. The control valve 17 distributes oil pressure to hydraulic motors 1A and 1B, the boom cylinder 7, the arm cylinder 8, and the bucket cylinder 9 by a command from a driver. The hydraulic motors 1A and 1B drive two right and left crawlers attached to the lower traveling body 1 shown in FIG. 1.

An input/output terminal of an electrical system of the motor generator 12 is connected to a storage circuit 90 via the inverter 18. An electric motor 21 for turning (load electric motor) is connected to the storage circuit 90 via another inverter 20. The storage circuit 90 includes a capacitor, and a converter which controls the charging and discharging of the capacitor. For example, an electric double-layered capacitor is used as the capacitor. The storage circuit 90 and the inverter 20 are controlled by the control device 30. A lithium ion capacitor may be used instead of the electric double-layered capacitor. An electric device capable of charge and discharge other than the capacitor may be used. The electric device capable of charge and discharge includes a secondary battery, i.e., a lithium ion battery.

While the assisting operation of the motor generator 12 is performed, requisite electric power is supplied to the motor generator 12 from the storage circuit 90, and the motor generator 12 outputs mechanical power (motive power). While the power-generating operation of the motor generator 12 is performed, requisite power is supplied from the engine 11, and electric power is output. The electric power generated by the motor generator 12 is supplied to the storage circuit 90. The inverter 18 receives a command from the control device 30 and controls the motor generator 12 so that the motor generator 12 outputs the commanded motive power or electric power.

The electric motor 21 for turning is driven with an alternating current by a pulse-width modulation (PWM) control signal from the inverter 20, and both the assisting operation which generates motive power and the regenerative operation which generates electric power can be selectively performed.

The inverter 20 receives a command from the control device 30 and controls the electric motor 21 for turning so that the electric motor 21 generates the commanded motive power. For example, an IPM motor is used for the electric motor 21 for turning. The IPM motor generates a large induced electromotive force at the time of regeneration.

During the assisting operation of the electric motor 21 for turning, electric power is supplied to the electric motor 21 for turning from the storage circuit 90. The motive power (torque) of the electric motor 21 for turning is transmitted to the turning mechanism 2 shown in FIG. 1 via a speed reducer 24. In this case, the speed reducer 24 reduces the rotating speed. Accordingly, the torque generated by the electric motor 21 for turning increases and is transmitted to the turning mechanism 2. Additionally, during the regenerating operation, the rotational motion of the upper turning body 3 is transmitted to the electric motor 21 for turning via the speed reducer 24, and thereby, the electric motor 21 for turning generates regenerative electric power. In this case, the speed reducer 24 increases the rotating speed contrary to that during the assisting operation. Accordingly, the engine speed of the electric motor 21 for turning can be increased. The regenerative electric power is supplied to the storage circuit 90.

A resolver 22 detects the position of a rotary shaft of the electric motor 21 for turning in its rotational direction. A detection result is input to the control device 30. A turning angle and a turning direction are derived by detecting the positions in the rotational direction of the rotary shaft before and after the operation of the electric motor 21 for turning.

The mechanical brake 23 is connected to the rotary shaft of the electric motor 21 for turning, and generates a mechanical braking force. The braking state and release state of the mechanical brake 23 are changed by an electromagnetic switch which is controlled from the control device 30.

The pilot pump 15 generates the pilot pressure required for a hydraulic operation system. The generated pilot pressure is supplied to an operating device 26 via a pilot line 25. The operating device 26 includes a lever or a pedal, and is operated by a driver. The operating device 26 converts oil pressure on the primary side supplied from the pilot line 25 into oil pressure on a secondary side according to driver's operation. The oil pressure on the secondary side is transmitted to a control valve 17 via a hydraulic line 27, and is transmitted to a pressure sensor 29 via another hydraulic line 28.

A detection result of pressure detected by the pressure sensor 29 is input to the control device 30. Thereby, the control device 30 can detect situations of operation of the lower traveling body 1, the turning mechanism 2, the boom 4, the arm 5, and the bucket 6. In particular, in the hybrid operating machine according to the example, the electric motor 21 for turning drives the turning mechanism 2. Therefore, it is desired to detect the operation quantity of the lever for controlling the turning mechanism 2 with high precision. The control device 30 can detect the operation quantity of the lever with high precision via the pressure sensor 29.

Figure 3A:
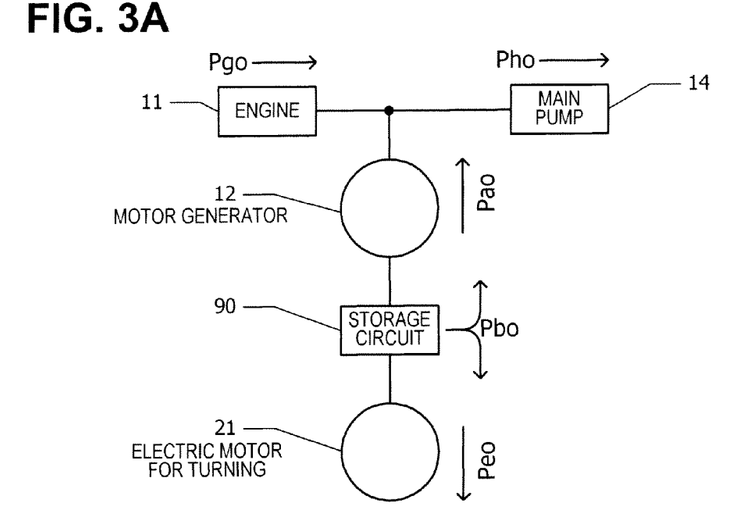
FIG. 3A is a block diagram showing the flow of the motive power and electric power of the hybrid operating machine according to the example.

A block diagram of the hybrid operating machine according to the example, and the flow of motive power and electric power are shown in FIG. 3A. An output Pgo from the engine 11 is supplied to the main pump 14 and the motor generator 12. When the assisting operation of the motor generator 12 is performed, the output (motive power) Pao of the motor generator is supplied to the main pump 14 from the motor generator 12. When the power-generating operation of the motor generator 12 is performed, the output (electric power)–Pao generated by the motor generator is input to the storage circuit 90. Here, the output when the assisting operation of the motor generator 12 is performed is defined as positive, and the output when the power-generating operation of the motor generator 12 is performed is defined as negative.

An electric power Pbo output from the storage circuit 90 is supplied to the motor generator 12 and the electric motor 21 for turning. The electric motor 21 for turning outputs an output (motive power) Peo in a power operation state. In a regenerating operation state, the output (electric power) –Peo is output, and is supplied to the storage circuit 90. Here, the output in the power operation state is defined as positive, and the output in the regenerating operation state is defined as negative. Additionally, the electric power output from the storage circuit 90 is defined as positive, and the electric power supplied to the storage circuit 90 is defined as negative.

Figure 3B:
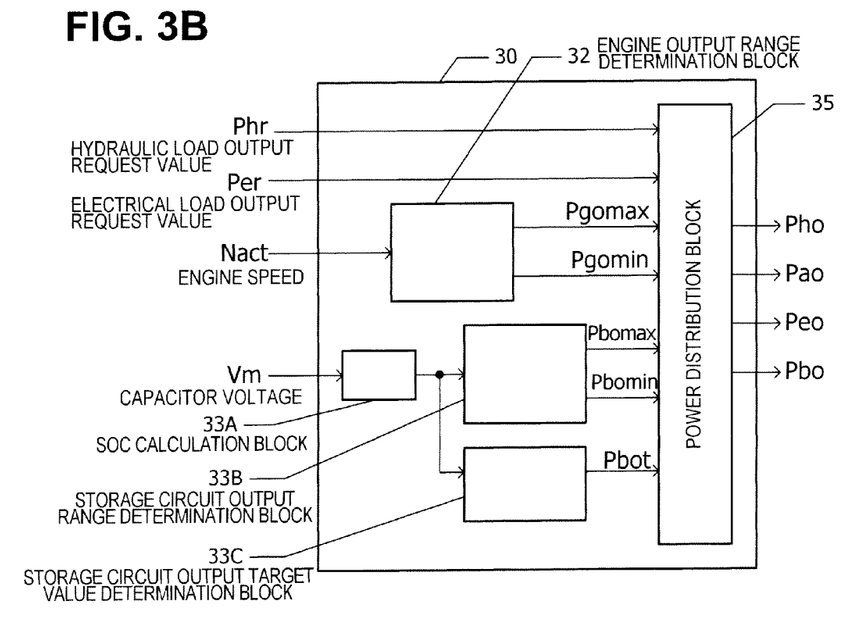
FIG. 3B is a block diagram showing the function of a control device.

A block diagram of the function of the control device 30 is shown in FIG. 3B. A hydraulic load output request value Phr, an electrical load output request value Per, an engine speed Nact, and a capacitor voltage Vm of the storage circuit 90 are input to the control device 30.

The hydraulic load output request value Phr is the sum of powers required for hydraulic mechanisms to be driven by the oil pressures such as the hydraulic motors 1A and 1B, boom cylinder 7, arm cylinder 8, bucket cylinder 9, and the like, which are shown in FIG. 2. For example, the hydraulic load output request value Phr is calculated from the operation quantity of the operating lever which an operator operates.

The electrical load output request value Per is equivalent to the electric power required by the electric motor 21 for turning shown in FIG. 2. For example, the electrical load output request value Per is calculated from the operation quantity of the operating lever which an operator operates.

The engine speed Nact is equivalent to the actual engine speed of the engine 11 shown in FIG. 2. The engine 11 is always driven during the operation of the operating machine, and the engine speed Nact thereof is detected. The capacitor voltage Vm is equivalent to the voltage between terminals of a capacitor of the storage circuit 90 shown in FIG. 2.

The engine speed Nact is input to an engine power range determination block 32. A map or conversion table for obtaining an engine power upper limit Pgomax and an engine power lower limit Pgomin from the engine speed Nact is stored in the engine power range determination block 32. The engine power range determination block 32 calculates the engine power upper limit Pgomax and the engine power lower limit Pgomin from the input engine speed Nact, and gives the engine power upper and lower limits to a power distribution block 35.

The capacitor voltage Vm is input to an SOC calculation block 33A. The SOC calculation block 33A calculates the charging rate of the capacitor (state of charge: SOC) from the input capacitor voltage Vm. The calculated charging rate is given to a storage circuit output range determination block 33B and a storage circuit output target value determination block 33C.

A map or conversion table for calculating a storage circuit output upper limit Pbomax and a storage circuit output lower limit Pbomin from the charging rate is stored in the storage circuit output range determination block 33B. The storage circuit output range determination block 33B determines the storage circuit output upper limit Pbomax and the storage circuit output lower limit Pbomin on the basis of the charging rate. The storage circuit output upper limit Pbomax is equivalent to an upper limit of the electric power output from the storage circuit 90. The storage circuit output lower limit Pbomin is negative, and the absolute value thereof is equivalent to an upper limit of the electric power to be supplied to the storage circuit 90. The proper range of input/output electric power of the storage circuit 90 is defined by the storage circuit output upper limit Pbomax and the storage circuit output lower limit Pbomin. The determined storage circuit output upper limit Pbomax and storage circuit output lower limit Pbomin are input to the power distribution block 35.

Hereinafter, an example of a method of calculating the storage circuit output upper limit Pbomax and the storage circuit output lower limit Pbomin will be described. The proper range of charging and discharging currents and the proper range of the charging rate are determined for the capacitor of the storage circuit 90. The storage circuit output upper limit Pbomax is set so that the discharging current of the capacitor does not exceed an upper limit of the proper range and the charging rate of the capacitor does not fall below a lower limit of the proper range. The storage circuit output lower limit Pbomin is set so that the charging current of the capacitor does not exceed an upper limit of the proper range and the charging rate of the capacitor does not exceed an upper limit of the proper range.

A map or conversion table for calculating a storage circuit output target value Pbot from the charging rate is stored in the storage circuit output target value determination block 33C. The storage circuit output target value determination block 33C determines the storage circuit output target value Pbot on the basis of the charging rate. The determined storage circuit output target value Pbot is input to a power distribution block 35.

Hereinafter, an example of a method of calculating the storage circuit output target value Pbot will be described. A target value of the charging rate is determined for the capacitor of the storage circuit 90. The storage circuit output target value Pbot is determined so that an actual charging rate approaches the target value of the charging rate. For example, if the actual charging rate is higher than the target value of the charging rate, it is preferable to discharge the capacitor. Therefore, the storage circuit output target value Pbot becomes positive. On the contrary, if the actual charging rate is lower than the target value of the charging rate, it is preferable to charge the capacitor. Therefore, the storage circuit output target value Pbot becomes negative. The absolute value of the storage circuit output target value Pbot is proportional to the deviation of the actual charging rate when measured from the target value of the charging rate.

The power distribution block 35 determines an electrical load output command value Peo, a hydraulic load output command value Pho, a storage circuit output command value Pbo, and a motor-generator output command value Pao. A method of determining these command values will be described with reference to FIGS. 4 to 7.

Figure 4:
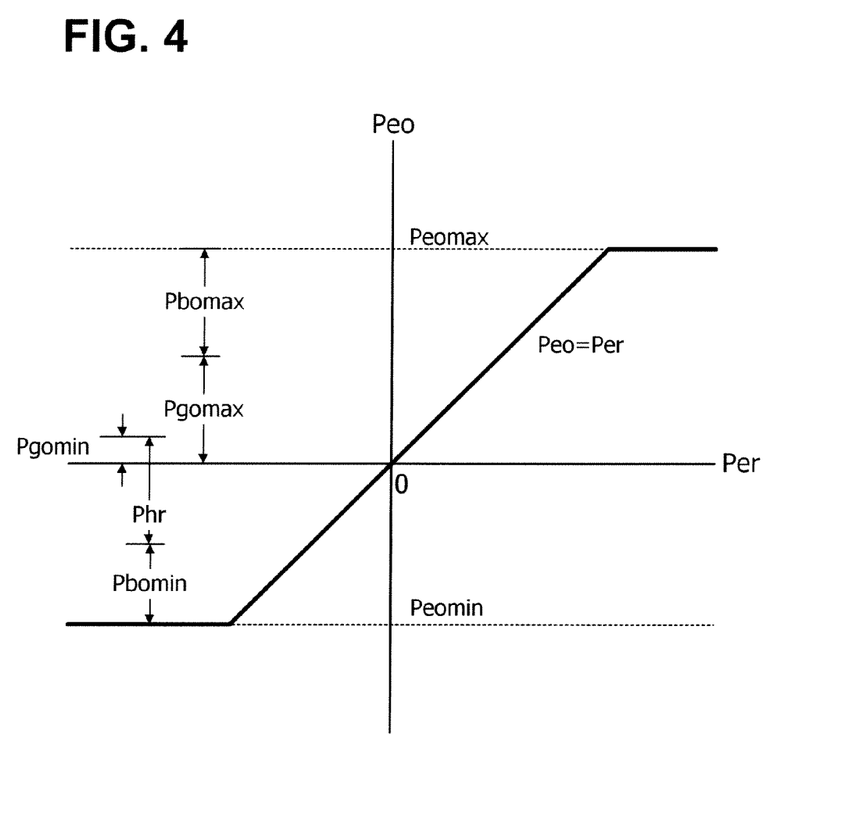
FIG. 4 is a graph showing the relationship between an electrical load output command value and an electrical load output request value.

FIG. 4 shows the relationship between the electrical load output request value Per and the electrical load output command value Peo. If the electrical load output request value Per is greater than a total value Peomax of the engine power upper limit Pgomax and the storage circuit output upper limit Pbomax, the electrical load output command value Peo is made equal to the total value Peomax. That is, $$Peo = Pgomax + Pbomax$$

is established. This means that the electrical load output command value Peo does not exceed the maximum power which can be taken out from the engine 11 and the storage circuit 90.

If the electrical load output request value Per is smaller than a value Peomin obtained by subtracting the hydraulic load output request value Phr and the absolute value of the storage circuit output lower limit Pbomin from the engine power lower limit Pgomin, the electrical load output command value Peo is made equal to this value Peomin. That is, $$Peo = Pgomin - Phr + Pbomin$$

is established. Since Pbomin is a negative value, an operator given to Pbomin is "+" (plus) in the above expression. This expression means that, in a state where the engine 11 is operated so that the power taken out from the engine 11 becomes the minimum, the generated output of the electric motor 21 for turning does not exceed a total value of the hydraulic load output request value Phr and an upper limit of the electric power which can be supplied to the storage circuit 90.

If the electrical load output request value Per is between Peomax and Peomin, the electrical load output command value Peo is made equal to the electrical load output request value Per. That is, $$Peo = Per$$

is established. This expression means that the output as needed for an electrical load is secured.

Figure 5:
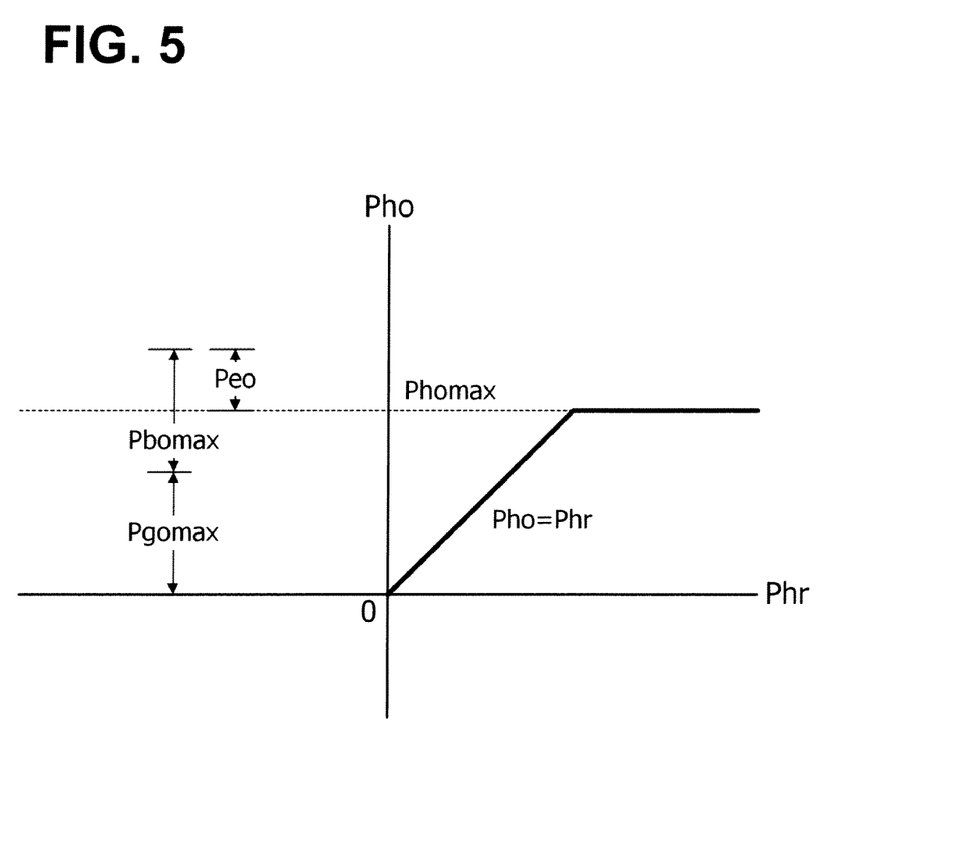
FIG. 5 is a graph showing the relationship between a hydraulic load output command value and a hydraulic load output request value.

FIG. 5 shows the relationship between the hydraulic load output request value Phr and the hydraulic load output command value Pho. If the hydraulic load output request value Phr exceeds a value Phomax obtained by subtracting the electrical load output command value Peo from the total value of the engine power upper limit Pgomax and the storage circuit output upper limit Pbomax, the hydraulic load output command value Pho is made equal to this value Phomax. That is, $$Pho = Pgomax + Pbomax - Peo$$

is established. This means that the hydraulic load output command value Pho does not exceed the remaining power obtained by subtracting the power equivalent to the electrical load output command value Peo, which is already determined, from the maximum power taken out from the engine 11 and the storage circuit 90.

If the hydraulic load output request value Phr is smaller than or equal to Phomax, the hydraulic load output command value Pho is made equal to the hydraulic load output request value Phr. That is, $$Pho = Phr$$

is established. This means that the output as needed for a hydraulic load is secured.

Figure 6A:
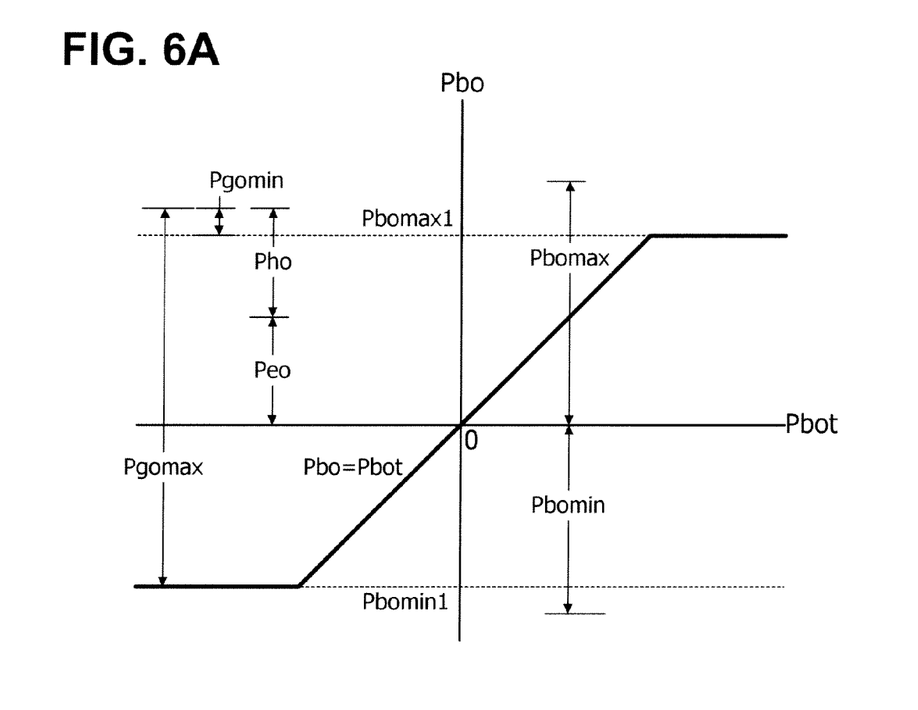
FIGS. 6A and 6B are graphs showing the relationship between a storage circuit output command value and a storage circuit output target value.
Figure 6B:
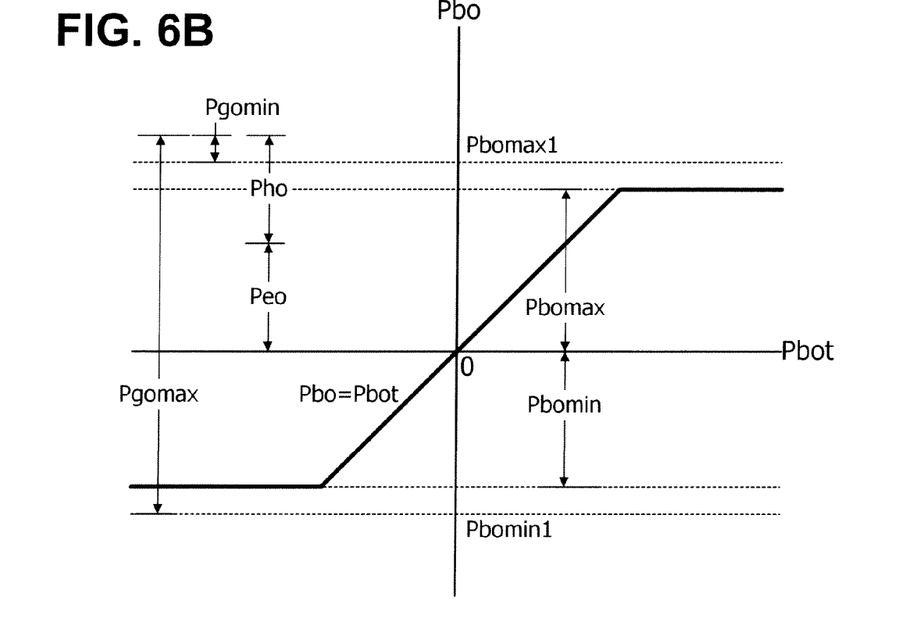

FIGS. 6A and 6B show the relationship between the storage circuit output target value Pbot and the storage circuit output command value Pbo. A value obtained by subtracting the engine power lower limit Pgomin from a total value of the electrical load output command value Peo determined on the basis of the graph shown in FIG. 4, and the hydraulic load output command value Pho determined on the basis of the graph shown in FIG. 5 is represented by Pbomax1. A value obtained by subtracting the engine power upper limit Pgomax from a total value of the electrical load output command value Peo and the hydraulic load output command value Pho is represented by Pbomin1.

FIG. 6A shows a case where Pbomax1 is smaller than the storage circuit output upper limit Pbomax determined by the storage circuit output range determination block 33B of FIG. 3B, and Pbomin1 is greater than the storage circuit output lower limit Pbomin. If the storage circuit output target value Pbot exceeds Pbomax1, the storage circuit output command value Pbo is made equal to Pbomax1. This means that, since the electric power which can be taken out from the storage circuit 90 is sufficiently large, the engine 11 is operated with the output lower limit Pgomin thereof, and surplus electric power is not taken out from the storage circuit 90. If the storage circuit output target value Pbot falls below Pbomin1, the storage circuit output command value Pbo is made equal to Pbomax1. This means that, since the charging rate of the storage circuit 90 is insufficient, the engine 11 is operated with the output upper limit Pgomax thereof, and electric power is supplied to the storage circuit 90.

If the storage circuit output target value Pbot is between Pbomax1 and Pbomin1, the storage circuit output command value Pbo is made equal to the storage circuit output target value Pbot. This condition makes it possible to bring the charging rate of the storage circuit 90 closer to the target value of the charging rate.

FIG. 6B shows a case where Pbomax1 is greater than the storage circuit output upper limit Pbomax determined by the storage circuit output range determination block 33B of FIG. 3B, and Pbomin1 is smaller than the storage circuit output lower limit Pbomin. In this case, the upper and lower limits of the storage circuit output command value Pbo are limited so that the storage circuit output command value Pbo falls within a proper range determined by the storage circuit output range determination block 33B shown in FIG. 3B.

As such, the upper limit of the storage circuit output command value Pbo is limited to the smaller value of Pbomax and Pbomax1, and the lower limit thereof is limited to the greater value of Pbomin and Pbomin1.

Figure 7A:
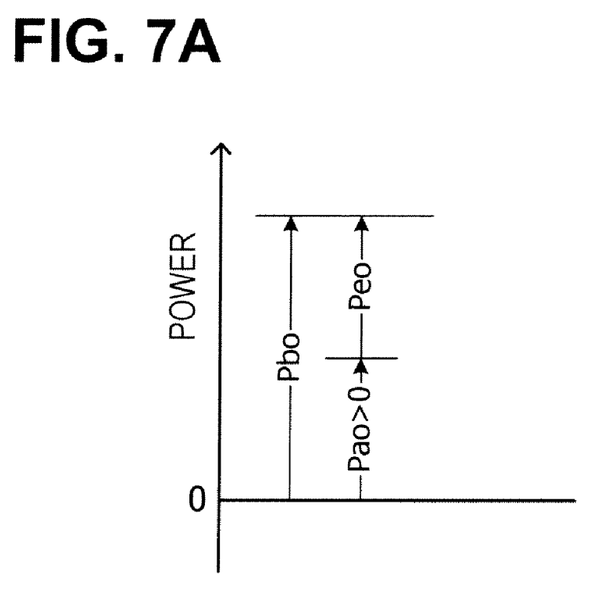
FIGS. 7A and 7B are graphs showing the relationship between a motor-generator output command value, a storage circuit output command value, and an electrical load output command value.
Figure 7B:
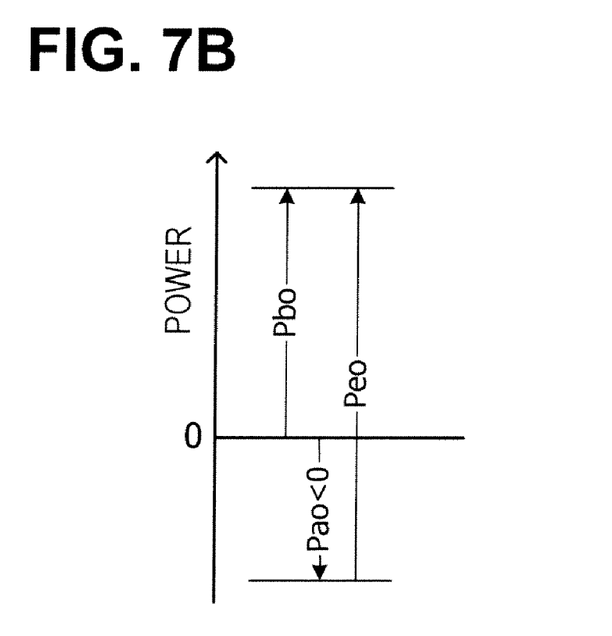

FIGS. 7A and 7B are charts showing a method of determining the motor-generator output command value Pao. It can be seen from FIG. 3A that $$Pbo = Pao + Peo$$

is established. If the storage circuit output command value Pbo and the electrical load output command value Peo have been determined, the output Pao of the motor generator 12 is calculated from the above-mentioned expression.

As shown in FIG. 7A, if the storage circuit output command value Pbo is greater than the electrical load output command value Peo, the assisting operation of the motor generator 12 is performed with surplus electric power, and the motive power Pao is output. As shown in FIG. 7B, if the storage circuit output command value Pbo is smaller than the electrical load output command value Peo, power generating operation of the motor generator 12 is performed in order to supply a deficiency of electric power, and the electric power Pao is output.

Figure 8:
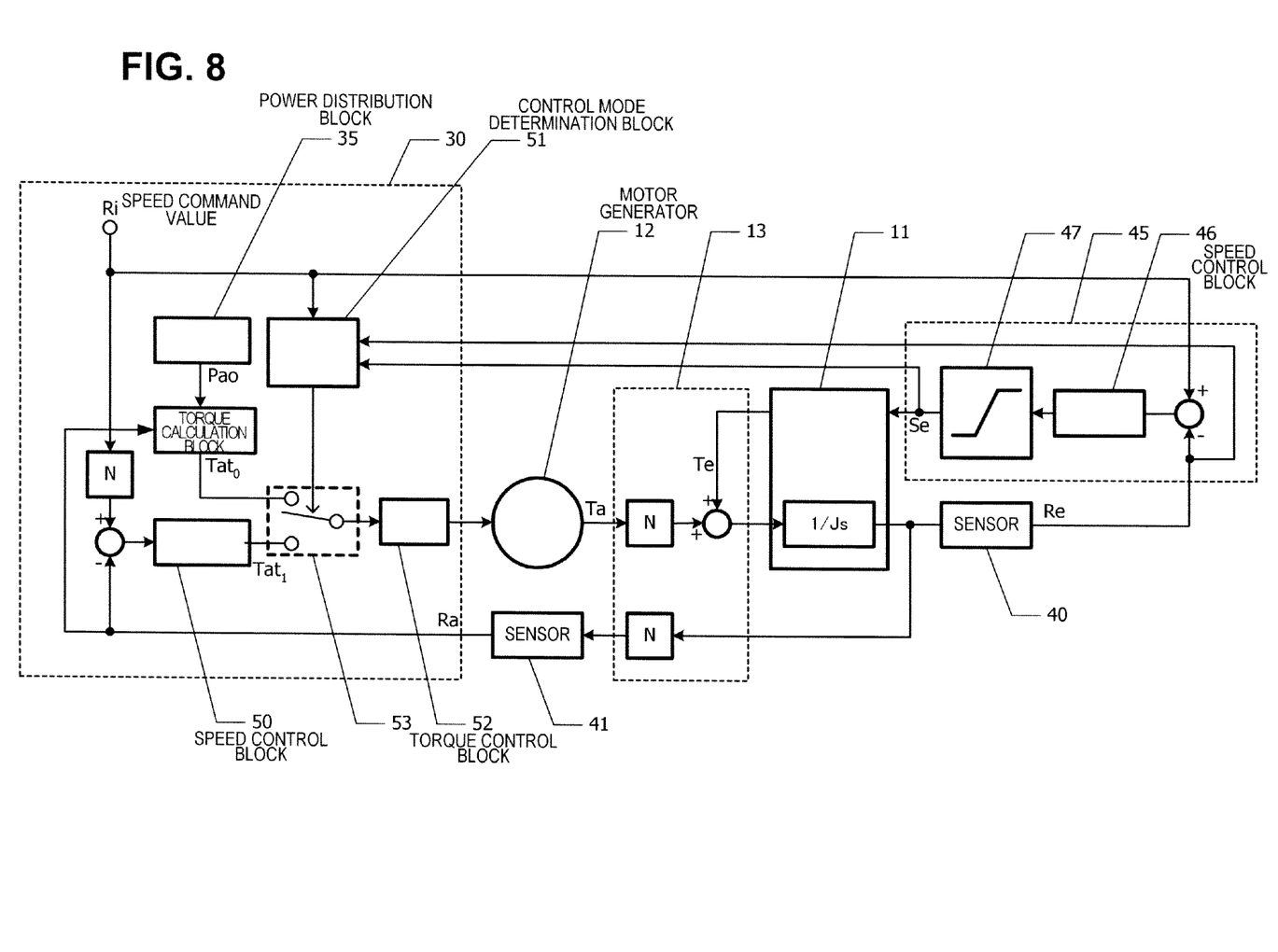
FIG. 8 is a functional block diagram of a control system of an engine and a motor generator.

A block diagram of a control system of the engine 11 and the motor generator 12 is shown in FIG. 8. The torque transmission machine 13 adds up the torque Te generated by the engine 11, and N times of the torque Ta generated by the motor generator 12. Here, N is a reduction ratio of the torque transmission machine 13. The speed sensor 40 measures the rotating speed of the rotary shaft which rotates with the total torque of the torque Te generated by the engine 11, and the torque Ta generated by the motor generator 12. The block of 1/Js of FIG. 8 express as a physical model of a continuous system a state where the acceleration generated by applying torque to an inertial body of inertia moment J is integrated and converted into a speed.

The speed sensor 41 attached to the motor generator 12 also measures the rotating speed of the rotary shaft which rotates with the total torque. However, the speed sensor 41 measures the rotating speed multiplied by the reduction ratio (N).

A speed command value Ri for the engine 11 is stored in the control device 30. The speed control block 46 of the engine controller 45 calculates required torque on the basis of the deviation of an actual measurement value Re of the rotating speed of the engine 11 from the speed command value Ri. For example, PID control is used for calculation of the required torque. The injection quantity calculation block 47 determines a fuel injection amount Se on the basis of the required torque. If the required torque exceeds an allowable upper limit (torque limit), the fuel injection amount Se is limited so as not to exceed the allowable upper limit. The control of limiting the fuel injection amount Se is called "torque limit control." The engine 11 is controlled on the basis of the determined fuel injection amount Se.

The power distribution block 35 of the control device 30, as shown in FIG. 3B, calculates the output command value Pao of the motor generator 12. A torque command value $Tat_0$ of the motor generator 12 is calculated from the rotating speed Ra of the motor generator 12 measured by the speed sensor 41, and the output command value Pao. Under normal conditions, the torque command value $Tat_0$ is input to a torque control block 52. The torque control block 52 controls the motor generator 12 so that the torque generated by the motor generator 12 becomes equal to the torque command value $Tat_0$. In addition, the inverter 18 shown in FIG. 2 is omitted in FIG. 8.

The speed command value Ri, the actual measurement value Re of the rotating speed of the engine 11, and the fuel injection amount Se are input to a control mode determination block 51. The control mode determination block 51 determines, on the basis of such information, whether the control mode of the motor generator 12 should be a torque control or a speed control.

The speed control block 50 calculates a torque command value $Tat_1$ on the basis of the deviation of an actual measurement value Ra of the rotating speed of the motor generator 12 from a value that is the speed command value Ri multiplied by the reduction ratio (N). The torque command value $Tat_1$ is calculated, for example, by the following expression.

$$Tat_1 = Kx(RixN - Ra) + T_0$$

Here, K is a proportional constant, and $T_0$ is an initial value of torque. If the actual measurement value Ra of the rotating speed is smaller than the speed command value Ri multiplied by the reduction ratio (N), the torque command value $Tat_1$ increases as the deviation increases.

The switching block 53 inputs any one of the torque command values $Tat_0$ and $Tat_1$ to the torque control block 52 by a command from the control mode determination block 51.

If the control mode determination block 51 has determined that the control mode is to be a torque control, the switching block 53 is controlled so that the torque command value $Tat_0$ is given to the torque control block 52. At this time, the torque control of the motor generator 12 is performed. If it is determined that the control mode is to be a speed control, the switching block 53 is controlled so that torque command value $Tat_1$ is given to the torque control block 52. At this time, the speed control of the motor generator 12 is performed. In this way, the control mode of the motor generator 12 can be switched.

As an initial value $T_0$ of the torque of the above expression, for example, the torque command value $Tat_0$ when the control mode is switched to the speed control from the torque control can be adopted.

Figure 9:
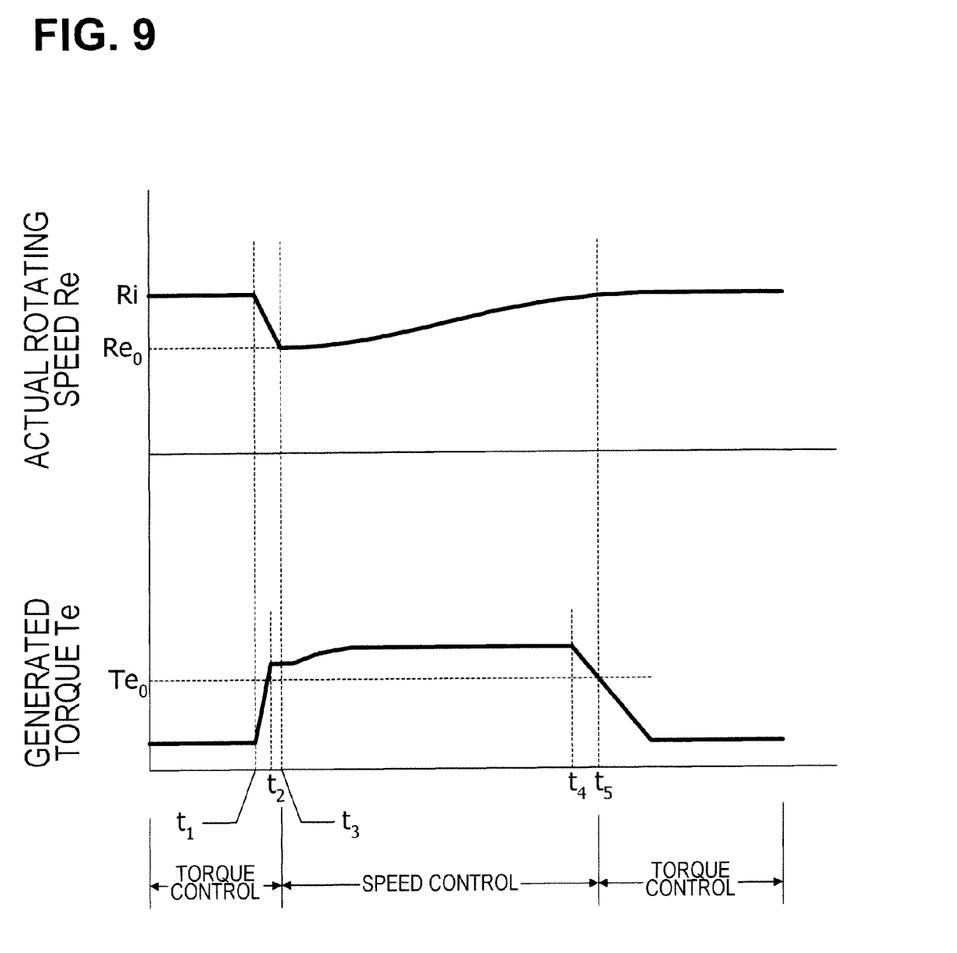
FIG. 9 is a graph showing an example of a time variation of the actual rotating speed and generated torque of the engine.

An example of a time history of the actual measurement value Re of the rotating speed of the engine 11 and the generated torque Te is shown in FIG. 9. The engine 11 is operated in an almost unloaded state till time $t_1$. The actual rotating speed Re of the engine 11 coincides with the speed command value Ri. At this time, the torque control of the motor generator 12 is performed. When the hydraulic load increases, and load is applied to the engine 11 at time $t_1$, the rotating speed Re decreases. Simultaneously, the torque Te generated by the engine 11 increases by the control of the speed control block 46 of the engine controller 45. If the load is large, the torque limit control is started at time $t_2$. After the time $t_2$ when the torque limit control has been started, the torque Te of the engine 11 hardly increases irrespective of the increase of hydraulic load.

At time $t_3$, the rotating speed Re decreases to a speed control start threshold $Re_0$. When the control mode determination block 51 detects that the rotating speed Re has decreased to the speed control start threshold $Re_0$, the control mode is switched to the speed control from the torque control. By performing the speed control of the motor generator 12, the actual measurement value Re of the rotating speed begins to increase toward the speed command value Ri.

When the torque required for the engine 11 decreases, the required torque determined by the speed control block 46 decreases, and the torque limit control is released. Hereinafter, the process in which the torque limit control is released will be more concretely described.

When the load torque of an engine 11 falls below the torque at the time when torque limit control starts, the torque generated by the motor generator 12 which is speed-controlled is not used to assist the load torque of the engine 11, but is used to return the engine speed of the engine 11 to the speed command value Ri. For this reason, the actual measurement value Re of the rotating speed of the engine 11 approaches the speed command value Ri. Thereby, the required torque to be determined by the speed control block 46 decreases, and the torque limit control is released.

In FIG. 9, when the load torque of the engine 11 begins to decrease at time $t_4$, the torque Te generated by the engine 11 begins to decrease.

At time $t_5$, the torque Te generated by the engine 11 decreases to a speed control release threshold $Te_0$. When the control mode determination block 51 detects that the torque Te has decreased to the speed control release threshold $Te_0$, the control mode is returned to the torque control from the speed control. In addition, the control mode determination block 51 can calculate the torque Te generated by the engine 11 from the fuel injection amount Se.

As the speed control release threshold $Te_0$, for example, a value slightly smaller than the rated maximum torque of the engine 11, for example, a value smaller than the rated maximum torque by 50 Nm can be employed.

The power distribution block 35 calculates the output command value Pao of the motor generator 12 on the assumption that the speed control of the engine 11 is normally performed. The torque command value $Tat_0$ determined on the basis of this output command value Pao is also based on the premise that the speed control of the engine 11 is normally performed. Accordingly, if the torque limit control is started, or if the actual measurement value Re of the rotating speed of the engine 11 decreases significantly from the speed command value Ri transitionally, there is no assurance that the torque command value $Tat_0$ is a proper value for maintaining the rotating speed of the engine 11 at the speed command value Ri.

By switching the control mode of the motor generator 12 to the speed control as in the example, the rotating speed Re of the engine 11 can be returned to the vicinity of the speed command value Ri by increasing the generated torque Ta of the motor generator 12 without bringing about the stalling of the engine.

In the case that the speed control of the engine 11 is appropriately performed, if the speed control of the motor generator 12 is performed, the assisting operation of the motor generator 12 is performed whenever the rotating speed Re of the engine 11 decreases. If the electrical energy (charging rate SOC of the capacitor) stored in the storage circuit 90 decreases by assisting operation, the storage circuit output target value Pbot calculated by the storage circuit output target value determination block 33C shown in FIG. 3B becomes negative (a command of charging). Thereby, the power-generating (assisting) operation of the motor generator 12 is performed, and electric power is supplied to the storage circuit 90. By performing an unnecessary assisting operation in this way, extracting electric power from the storage circuit 90 and supplying electric power to the storage circuit 90 are repeated, and efficiency is degraded.

On the other hand, when the torque control of the motor generator 12 is performed, and the torque generated by the engine 11 is excessive, the power-generating operation of the motor generator 12 is performed by the function of the control device 30 shown in FIG. 3B. If the speed control of the engine 11 is appropriately performed, the generation of loss caused by repetition of extracting electric power from the storage circuit 90 and supplying electric power to the storage circuit 90 can be prevented by performing the torque control of the motor generator 12.

Figure 10:
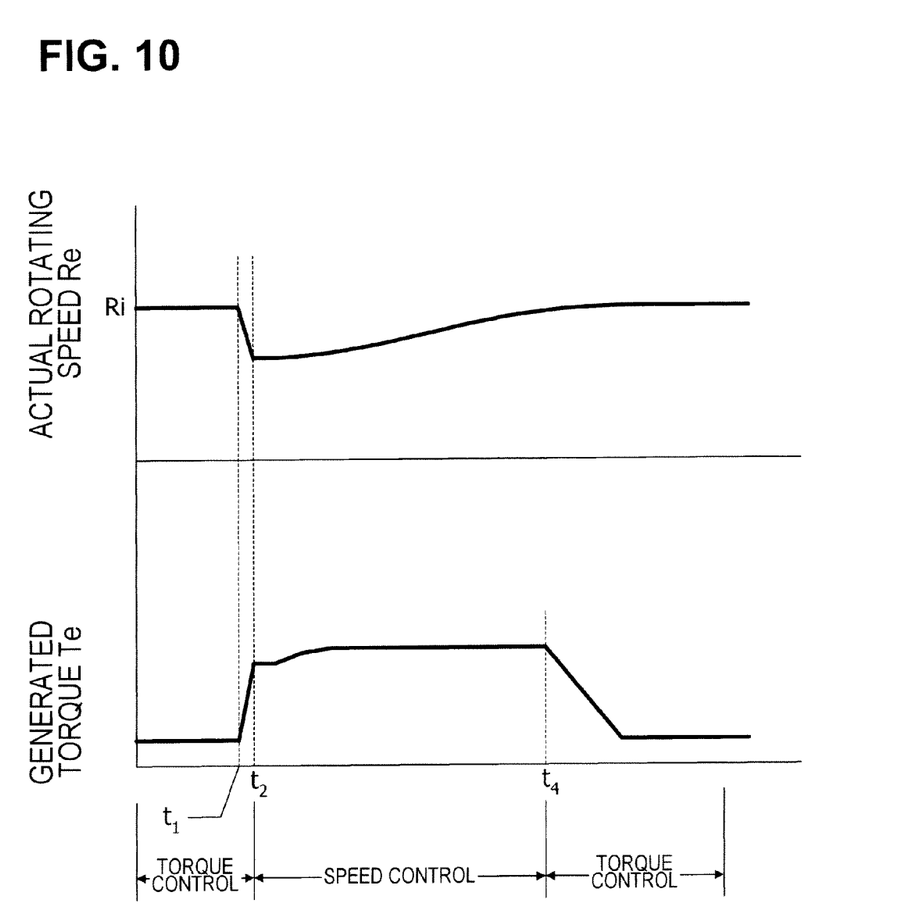
FIG. 10 is a graph showing another example of a time variation of the actual rotating speed and generated torque of the engine.

Another example of a time history of the actual measurement value Re of the rotating speed of the engine 11 and the generated torque Te is shown in FIG. 10. In FIG. 9, the triggering of switching the control mode to the speed control from the torque control has been detected from the change of the actual measurement value Re of the rotating speed. In the example shown in FIG. 10, the control mode is switched to the speed control from the torque control, with the start of the torque limit control of the engine 11 as a trigger. For this reason, the speed control is started at time $t_2$ when the torque limit control is started. The actual measurement value Re of the rotating speed begins to increase at time $t_2$.

At time $t_4$, the control mode is returned to the torque control from the speed control with the release of the torque limit control as a trigger.

Even in the example shown in FIG. 10, by switching the control mode to the speed control after time $T_2$ as in the example, the rotating speed Re of the engine 11 can be returned to the vicinity of the speed command value Ri, without bringing about the stalling of the engine.

Next, concrete configuration examples of the control device 30 will be described with reference to FIGS. 11A and 11B. The control device 30 is composed of mainly a total control module 30A which calculates the distribution ratio of motive power and electric power, and a servo control module 30B which performs control of the motor generator 12. In addition, the inverter 18 shown in FIG. 2 is omitted in FIGS. 11A and 11B.

Figure 11A:
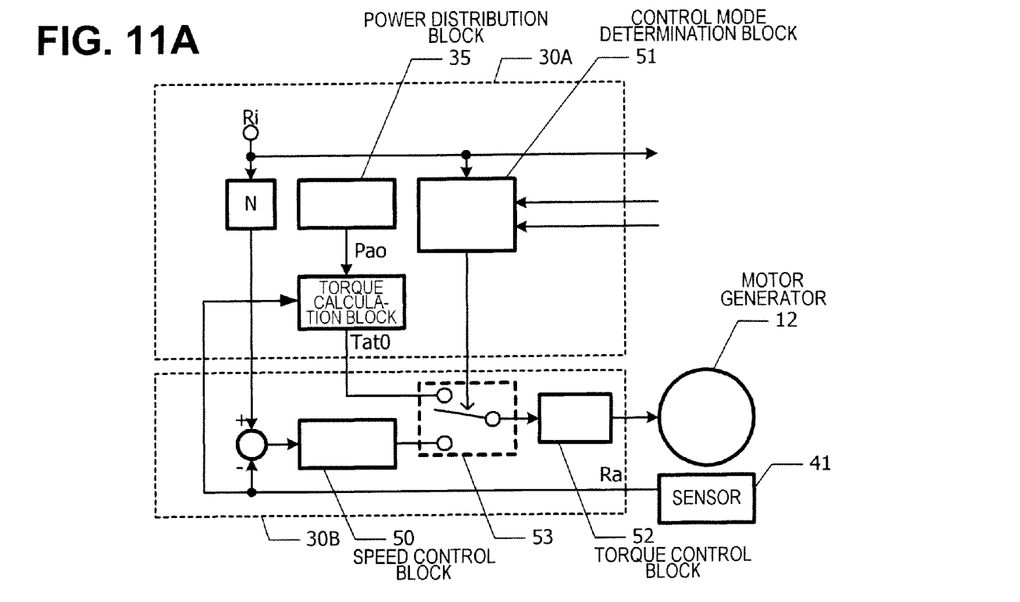
FIGS. 11A and 11B are block diagrams for explaining function sharing of a total control module and a servo control module.

In an example shown in FIG. 11A, the function of calculating the deviation of the actual measurement value Ra of the rotating speed from the speed command value Ri, and the functions of the speed control block 50, the switching block 53, and the torque control block 52, are realized by the servo control module 30B. This configuration is effective if the calculation cycle of the servo control module 30B is sufficiently shorter than the calculation cycle of the total control module 30A. Since the calculation cycle of the servo control module 30B is short, the speed control can be performed so as to directly follow the fluctuation of the actual measurement value Ra of the rotating speed of the motor generator 12.

Figure 11B:
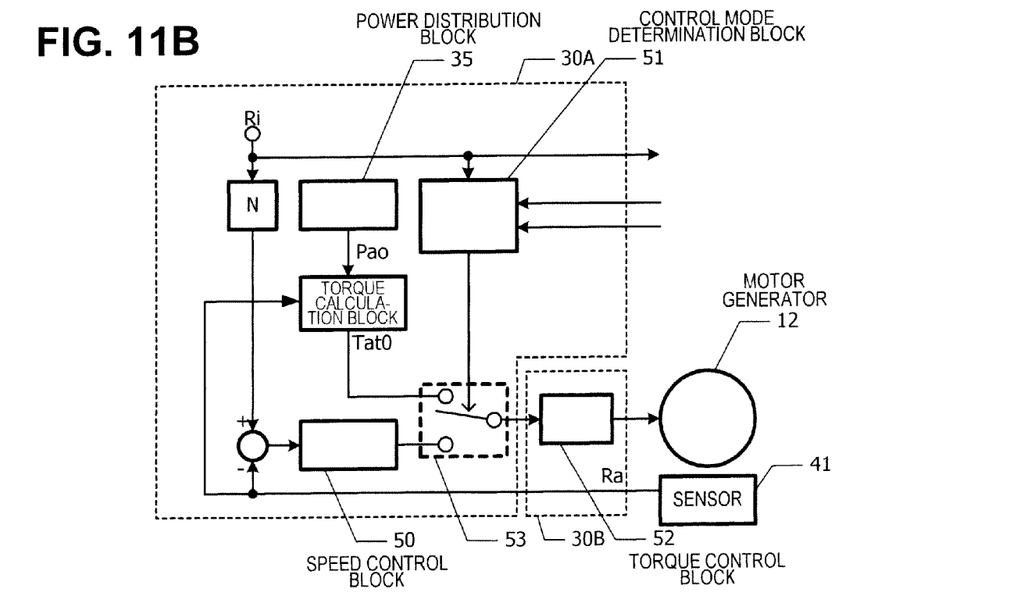

In an example shown in FIG. 11B, the function of calculating the deviation of the actual measurement value Ra of the rotating speed from the speed command value Ri, and the functions of the speed control block 50 and the switching block 53, are realized by the total control module 30A. In this configuration, the conventional servo control module 30B which performs the torque control of the motor generator 12 can be utilized as it is.

Instead of the electric motor 21 for turning in the example, a hydraulic motor for turning driven by the main pomp 14 may be used.

Although the invention has been described with reference to the above examples, the invention is not limited thereto. For example, it will be obvious to those skilled in the art that various alterations, improvements, combinations and suchlike can be made.

What is claimed is:

1. A hybrid operating machine comprising:
an engine which generates torque by combustion of a fuel,
a motor generator capable of selectively performing a power generation operation and an assisting operation,
an external load serving as an engine load,
a torque transmission machine which performs mutual transfer among the torque of the engine, a torque of the motor generator, and a torque to be applied to the external load,
a speed sensor which measures the rotating speed of the engine, and
a control device which controls the engine and the motor generator,
wherein the control device is capable of
storing a speed command value which indicates a target value of the speed control of the engine,
calculating a torque generated by the motor generator on the basis of a motive power required for the external load to perform a torque control of the motor generator,
performing a speed control of the motor generator on the basis of a difference between a rotating speed measured by the speed sensor, and the speed command value, and
switching a control mode where the torque control of the motor generator is performed, and a control mode where the speed control of the motor generator is performed.

2. The hybrid operating machine according to claim 1, wherein the control device switches the control mode of the motor generator on the basis of the rotating speed of the motor generator.

3. The hybrid operating machine according to claim 1, wherein a torque limit control of the engine is performed when the torque to be generated exceeds an allowable limiting value, and
the control device switches the control mode of the motor generator to the speed control from the torque control, with a start of the torque limit control of the engine as a trigger.

4. The hybrid operating machine according to claim 3, wherein the control device switches the control mode of the motor generator to the torque control from the speed control, with a release of the torque limit control of the engine as a trigger.

* * * * *